United States Patent [19]
Olafsson

[11] Patent Number: 5,550,862
[45] Date of Patent: Aug. 27, 1996

[54] METHOD AND APPARATUS FOR CENTERING EQUALIZER TAPS

[75] Inventor: Sverrir Olafsson, Seltjarnarnes, Iceland

[73] Assignee: Rockwell International Corporation, Seal Beach, Calif.

[21] Appl. No.: 283,345

[22] Filed: Aug. 1, 1994

[51] Int. Cl.[6] .............................. H03H 7/30; H04B 3/04
[52] U.S. Cl. .................. 375/229; 375/231; 364/715.07; 364/715.08; 364/724.02; 333/18
[58] Field of Search ............................. 375/229–233, 375/327, 344, 345, 348, 376; 364/715.07, 715.08, 724.02, 724.2, 732, 734; 333/18, 28 R

[56] References Cited

U.S. PATENT DOCUMENTS

| | | | |
|---|---|---|---|
| 4,004,226 | 1/1977 | Qureshi et al. | 375/231 |
| 4,606,045 | 8/1986 | Miller | 375/231 |
| 5,052,023 | 9/1991 | Beichler et al. | 375/230 |

*Primary Examiner*—Young T. Tse
*Attorney, Agent, or Firm*—George A. Montanye; David J. Arthur; Philip K. Yu

[57] ABSTRACT

A method and apparatus for a decision-directed timing recovery scheme to stabilize its equalizer positioning by centering equalizer taps is disclosed. First, the measure of equalizer positioning is calculated. The measure is then scaled to generate a timing bias signal. The timing bias signal is used to shift the timing phase of the equalizer input.

8 Claims, 3 Drawing Sheets

METHOD AND APPARATUS FOR CENTERING EQUALIZER TAPS

FIELD OF THE INVENTION

The present invention relates to telecommunication and more specifically to data transmission over telephone and wireless channels.

ART BACKGROUND

Data transmission through any form of channel rarely operates in as ideal a state as in theory. To compensate the distortion caused by the transmission channel, adaptive equalizers have been used to facilitate data reception. The equalizers, which date back to the use of loading coils to improve the characteristics of twisted-pair telephone cables for voice transmission, become even more necessary in high-speed data transmission for reducing the intersymbol interference introduced by the channel.

A conventional method for equalizer train-up has been to use a pseudo-random transmitter training sequence, Known at the receiver, to correlate with the incoming received signal samples. Knowing the start-time of the training sequence, the receiver feeds this sequence along with the received samples to an adaptive feedforward equalizer.

The feedforward equalizer generally uses a "steepest-descent" algorithm to adapt its tap coefficients until the set of the equalizer coefficients have converged to a point where they equalize the distorted received samples ("equalizing response"). The resulting equalizing response is then positioned in the equalizer according to the relative delay between the received signal samples and receiver-generated training sequence. However, for badly distorted channels where the total number of equalizer taps (the "span") is only just sufficient to contain the equalizing response, centering of this response within the taps thus becomes crucial for good equalizer performance.

Furthermore, adaptive equalizers typically require a significant portion of the processing power to keep updating its tap coefficients. As such, systems have been implemented with the span demanded by the worst-case channel will demand. If the equalizing response is not correctly positioned within the equalizer's taps, either the system performance will be degraded or the equalizer will require more than the minimum number of taps.

SUMMARY OF THE PRESENT INVENTION

A method and apparatus for centering equalizer taps in a decision-directed timing recovery system is disclosed. One of the problems typically associated with decision-directed timing recovery is the "wandering" of the equalizer response. Decision-directed timing recovery methods normally adjust the sample phase of the received signal as appropriate for the current state of the equalizer. However, as the equalizer is continually updating, often with erroneous data, the equalizer tap position may drift away from the center, with the decision-directed timing recovery promptly adjusting to that new position. The sampling phase may thus, over time, drift off several symbol intervals, causing serious degradation in reception quality. The present method, used in connection with a decision-directed timing recovery scheme, avoids this problem, as it stabilizes the equalizer positioning and prevents drifting.

To control the positions of the equalizing response within the equalizer span, the first and last segments of the equalizing response (the "tails" of the response) are compared and the timing phase of the input signal adjusted to ensure that the tails have approximately equal magnitude. The method comprises the steps of initializing an accumulator, accumulating in the accumulator a difference between the squared values of the first and last taps from the tap coefficients, comparing the accumulated difference with a predetermined threshold value and continuing to accumulate differences from the next pair of taps, toward the most central taps, if the accumulated difference does not exceed the threshold value. If the accumulated difference exceeds the threshold value, the difference is scaled by a predetermined factor and added to the timing frequency offset estimate in a timing recovery circuit to generate a timing bias signal to shift the sampling phase of the received signal in order to shift the equalizer taps. The process then repeats itself by zeroing the accumulator and continuing to accumulate the difference between the first and last taps of the updated equalizing response again, and so on. Another embodiment requires the process to accumulate the difference between the squared values of the end taps up to a predetermined number of taps, instead of the two most central taps.

BRIEF DESCRIPTION OF THE DRAWINGS

Additional objects, features and advantages of the present invention will be shown in the following description, wherein.

DETAILED DESCRIPTION OF THE DRAWINGS

A method and apparatus for centering equalizer taps is disclosed. In the following description, although a system diagram and a flow chart are described, it should be apparent to those skilled in the art that the present invention is not limited to any specific hardware components. Nor is the implementation of the present invention limited to any particular form of computer programming language.

Figure 1:
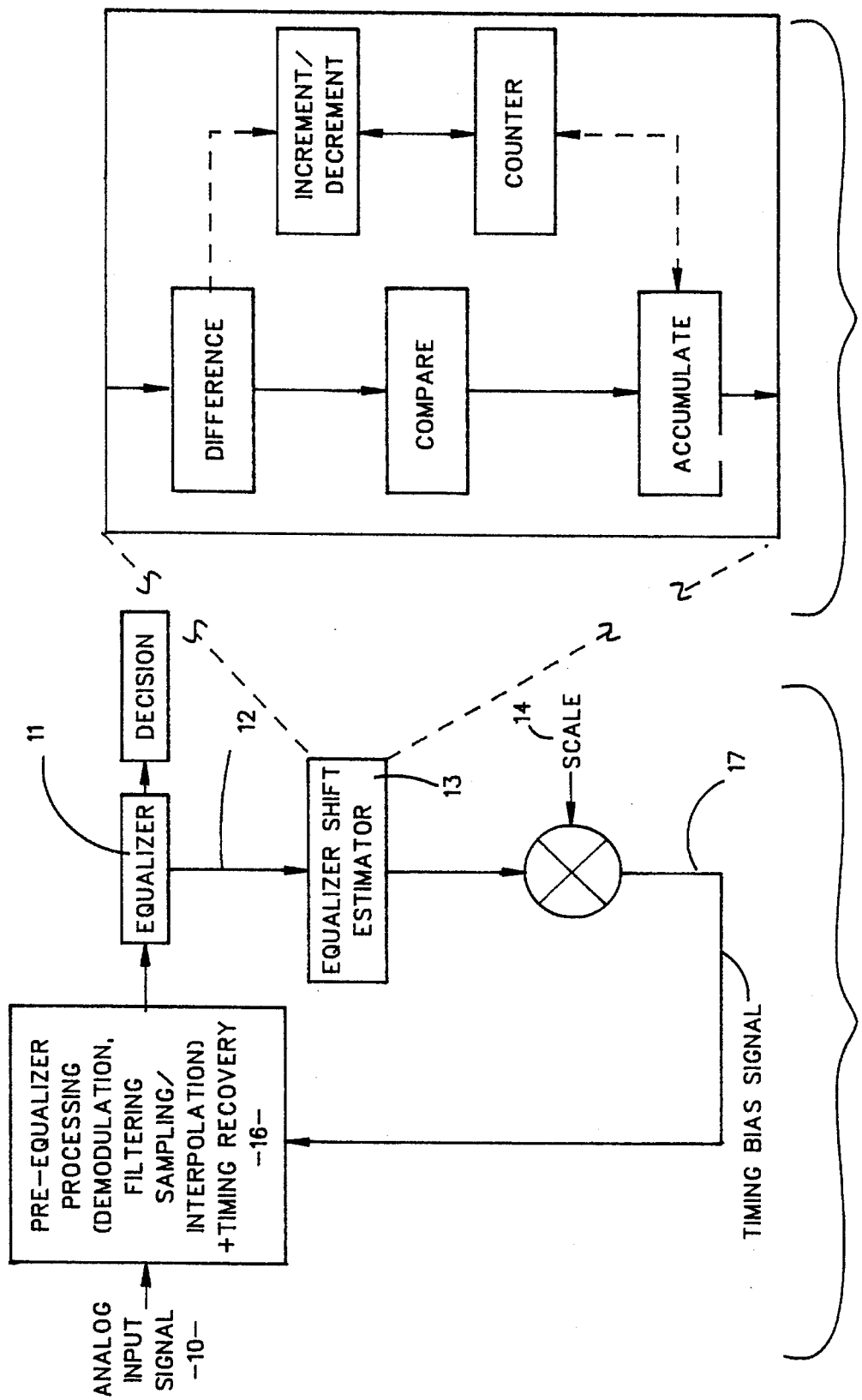
FIG. 1(a) is a simplified system diagram in accordance with the present invention.
"FIG. 1(b) illustrates the equalizer shift estimator in FIG. 1(a)."

Referring to FIG. 1(a) and 1(b), a simplified system diagram of the present invention is shown. Equalizer coefficients 12 are generated as a result of the received signal samples being applied to the feedforward equalizer 11. Within the equalizer shift estimator block 13, an accumulator is initialized to zero before it begins to accumulate the difference between the squared values of the first and last equalizer tap coefficients. Similarly, the difference between the squared values of the second and second-to-last coefficients is accumulated and so on through the two most central taps.

For the first embodiment, after each accumulation, the accumulated difference is compared with a pre-determined threshold. If the accumulated difference exceeds the threshold, then it is scaled by the scale factor 14 and applied to the timing recovery circuit 16 for shifting the sampling phase.

It should be noted that the alternate embodiment is to accumulate the differences for a predetermined number of tap pairs and then scale the accumulated difference.

A timing bias signal 17 can thus be generated to shift the sampling phase of the received signal in order to shift the equalizing response toward a more centered position. The resulting timing frequency bias signal 17 has the effect of slightly shifting the equalizing response within the equalizer span before the bias is removed by the timing recovery circuit 16. The equalizing response then stabilizes into a new position.

The accumulating/comparing process continues, even as the equalizer response stabilizes into a new position. The accumulator is re-set and the process begins again with the first and last taps of the updated equalizing response. Eventually, the equalizing response will be correctly positioned in the equalizer when the tails of the response end up being of approximately equal weight, or a steady state is reached where the bias signal contains an average component of zero (0).

For the first embodiment, if the accumulated difference does not exceed the threshold value after the last central tap difference is accumulated, no scaling 14 will occur and no timing bias signal 17 is generated. In other words, the taps are more or less correctly positioned, within a tolerance determined by the threshold value. The accumulator thus keeps accumulating through the two central taps and re-starts with the first and last taps of the next updated taps. The process of accumulating the differences and comparing the accumulated value with the threshold value is repeated throughout the data transmission.

For the alternate embodiment, the entire process reaches a steady state when the energy in the taps on each side is in balance, thus indicating the taps are more or less correctly positioned.

Figure 2:
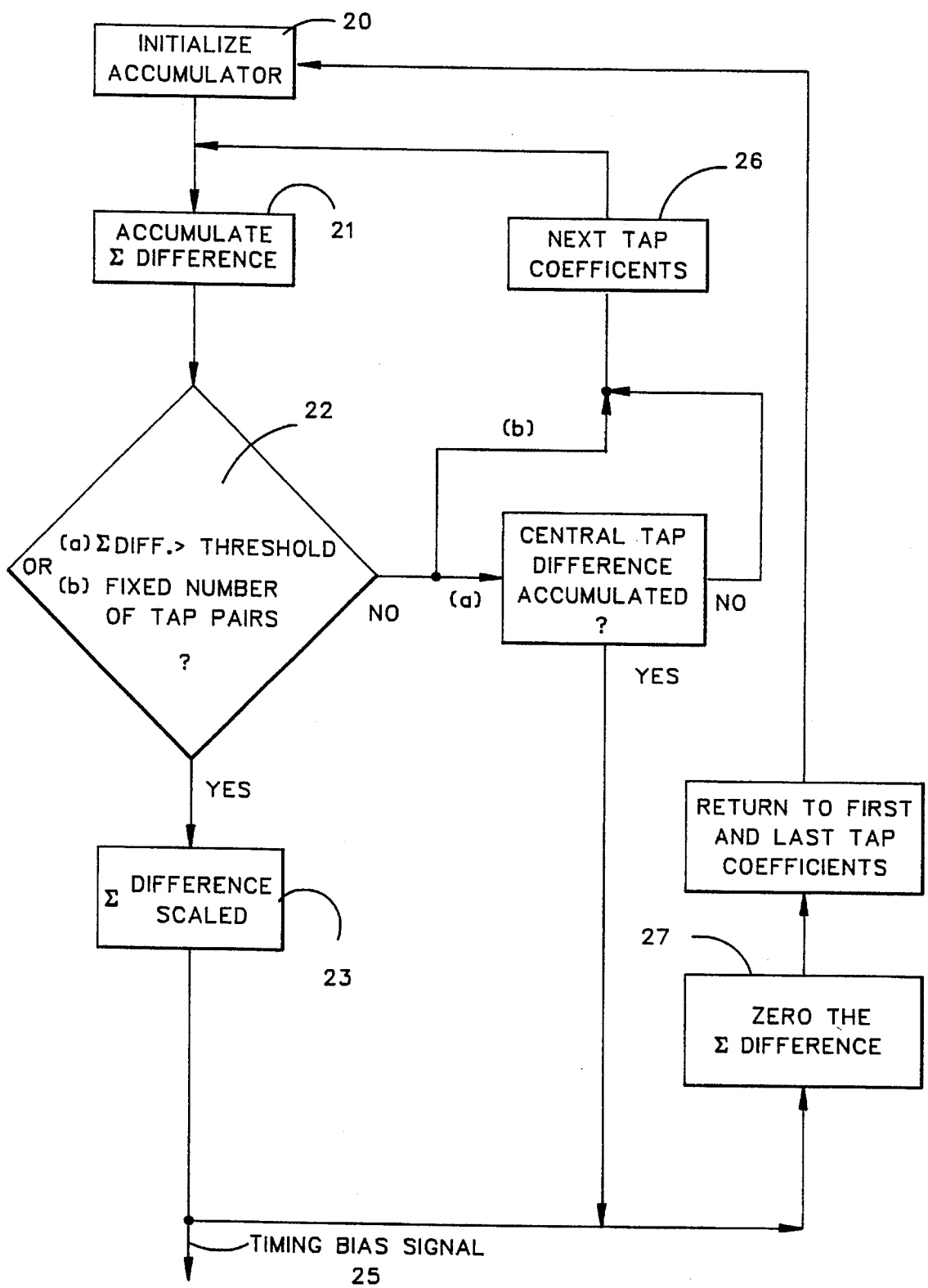
FIG. 2 is a flow chart illustrating the process flow of the present invention.

Referring to FIG. 2, a flow chart of the tap-centering process is described. The accumulator is first zeroed 20 and the difference between the squared values of the first and last taps 21 is accumulated. For the first embodiment, if the difference exceeds a predetermined threshold 22, the difference is scaled 23 to produce a timing bias signal 25. For the alternate embodiment, when the predetermined number of tap pairs is reached, the accumulated difference is scaled to produce the timing bias signal 25.

A timing bias signal can thus be generated 25 to shift the position of the equalizing response. The accumulator is then re-set 27 to accumulate the differences for comparison again, starting with the first and last tap coefficients of the updated equalizing response.

For the first embodiment, if the accumulated difference does not exceed the threshold, the accumulator will keep accumulating the differences through the two most central tap coefficients, at which time the accumulator will be re-set and re-started with the first and last taps of the equalizing response. If the response is correctly centered, i.e. the accumulated difference never exceeds the threshold, this loop is repeated continuously.

For the alternate embodiment, the process continues until the taps are correctly centered, the timing bias signal is small and the taps settle down.

Figure 3:
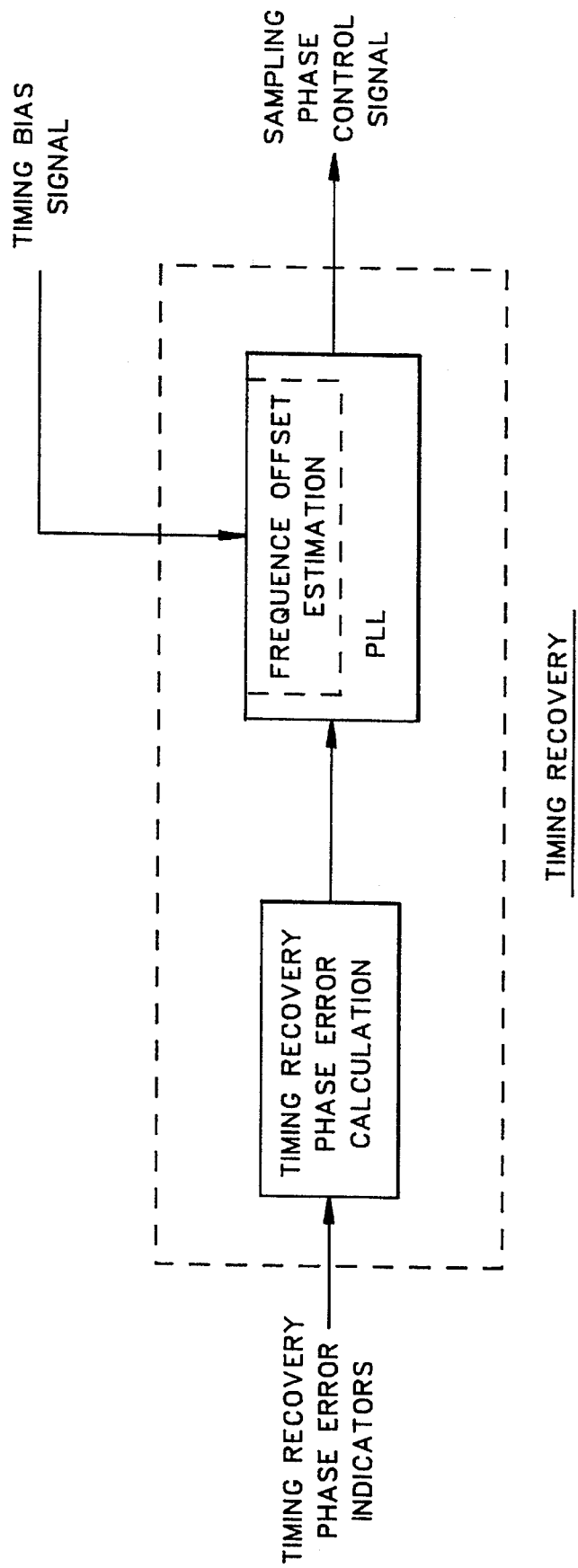
FIG. 3 illustrates how a timing bias signal may be used in connection with a timing recovery circuit.

FIG. 3 illustrates how the timing bias signal may be used in a timing recovery scheme during the pre-equalizer processing. With the timing bias signal applied to the phase-locked loop, a sampling phase control signal can be generated by the timing recovery circuit. With this sampling phase control signal, phase can be controlled either by sampling a continuous (analog) signal at adjustable sample spaces, or by using a fixed phase sampler and an interpolate filter.

What is claimed is:

1. A method of stabilizing equalizer positioning by centering a plurality of tap coefficients of a plurality of equalizer taps of a first equalizing response generated by an equalizer upon receiving a signal sample with a sampling phase as equalizer input, said first equalizing response having a first tap and a last tap, said method comprising the steps of:

calculating a measure of equalizer shift by comparing energies corresponding to said plurality of equalizer taps at both said first and last taps of said first equalizing response;

scaling said measure by a predetermined factor to generate a timing bias signal; and biasing said sampling phase of said equalizer input with the timing bias signal to cause said equalizer to shift its tap position.

2. The method as preferably defined in claim 1, wherein the method is used in connection with a decision-directed timing recovery system using an equalizer, wherein the step of calculating the measure of equalizer shift comprises the steps of:

a) zeroing an accumulator;

b) accumulating in said accumulator a difference between the squared values of the first and last taps from said tap coefficients;

c) comparing said difference with a predetermined threshold value;

d) continuing to accumulate differences from an incremented and decremented taps from said first and last taps, respectively, if said difference does not exceed said threshold value;

(e) upon reaching either of the two most central taps or the center tap, repeating the Step of (a) with an updated equalizing response;

(f) if said difference exceeds said threshold value, scaling said difference by the predetermined factor to generate the timing bias signal;

(g) initializing said accumulator and continuing to accumulate the differences from the first and last taps of an updated equalizing response as described in Step (a) again.

3. The method as preferably defined in claim 1, wherein the step of biasing comprises adding said timing bias signal to a frequency offset estimator of a phase-locked loop in said decision-directed timing recovery system and said phase-locked loop adjusting its timing phase according to said timing bias signal.

4. The method as preferably defined in claim 1, wherein the step of calculating said measure of equalizer shift comprises the steps of:

a) zeroing an accumulator;

b) accumulating in said accumulator a difference between the squared values of the first and last taps from said tap coefficients;

c) comparing said difference with a predetermined threshold value;

d) continuing to accumulate differences from an incremented and decremented taps from said first and last taps, respectively;

(e) upon accumulating through a predetermined number of tap pairs, scaling the accumulated difference by the predetermined factor to generate the timing bias signal;

(f) initializing said accumulator and continuing to accumulate the differences from the first and last taps of an updated equalizing response as described in Step (a) again.

5. The method as preferably defined in claim 4, further comprising the step of:

g) adding said timing bias signal to a frequency offset estimator of a phase-locked loop and said phase-locked loop adjusting its timing phase according to said timing bias signal.

6. A circuit for stabilizing equalizer positioning by centering a plurality of tap coefficients of a plurality of equalizer taps of a first equalizing response generated by an equalizer upon receiving a signal sample with a sampling phase as equalizer input, said plurality of equalizer taps having a first tap and a last tap, comprising:

means for calculating a measure of equalizer shift by comparing energies corresponding to said plurality of equalizer taps at both said first and last taps of said first equalizing response;

means for scaling said measure by a predetermined factor to generate a timing bias signal; and means for biasing said sampling phase of said equalizer input with the timing bias signal to cause said equalizer to shift its tap position.

7. In a decision-directed timing recovery system using an equalizer, a circuit for stabilizing equalizer positioning by centering a plurality of tap coefficients of a first equalizing response generated by the equalizer upon receiving a signal sample having a sampling phase as equalizer input, said tap coefficients having a first tap and a last tap, comprising:

means for calculating a measure of equalizer shift, comprising:

an accumulator means;

difference means for generating a difference between a squared value of the first tap and a squared value of the last tap from said plurality of tap coefficients, said difference accumulated by said accumulator means to generate an accumulated difference; and compare means for comparing the accumulated difference with a predetermined threshold value and if said accumulated difference does not exceed said threshold value, said accumulator means continuing to accumulate a difference from a squared second tap and a squared second-to-last tap;

scaling means for scaling the difference if the accumulated difference exceeds said predetermined threshold value to generate a timing bias signal, the generation of said timing bias signal causing said accumulator means to be initialized and said difference means to generate the difference from the first and last taps of a second equalizing response again; and biasing means using said timing bias signal to bias said sampling phase of said equalizer to shift its tap position.

8. In a decision-directed timing recovery system using an equalizer, a circuit for stabilizing equalizer positioning by centering a plurality of tap coefficients of a first equalizing response generated by the equalizer upon receiving a signal sample having a sampling phase as equalizer input, said tap coefficients having a first tap and a last tap, comprising:

means for calculating a measure of equalizer shift, comprising:

an accumulator means;

increment/decrement means for incrementing and decrementing tap pairs from the first and last taps, respectively, until a predetermined total number of taps is incremented and decremented;

difference means for generating a first difference between a squared value of the first tap and a squared value of the last tap from said plurality of tap coefficients, said difference means then continuing to generate a difference from incremented and decremented taps as incremented and decremented by said increment/decrement means, said differences being continuously accumulated by said accumulator means to generate an accumulated difference; and counter means coupled to said increment/decrement means and said difference means for counting the number of tap pairs, of which the difference has been accumulated until said predetermined total number of tap pairs is reached;

scaling means, upon reaching said predetermined number of tap pairs, for scaling the difference to generate a timing bias signal, the generation of said timing bias signal causing said accumulator means to be initialized and said difference means to generate the difference from the first and last taps of a second equalizing response again; and biasing means using said timing bias signal to bias said sampling phase of said equalizer to shift its tap position.

* * * * *